United States Patent
Callahan et al.

(10) Patent No.: US 10,891,113 B2
(45) Date of Patent: Jan. 12, 2021

(54) SOURCE CODE REWRITING DURING RECORDING TO PROVIDE BOTH DIRECT FEEDBACK AND OPTIMAL CODE

(71) Applicant: Apple Inc., Cupertino, CA (US)

(72) Inventors: Brooke K. Callahan, San Jose, CA (US); Michael S. Ferris, Sunnyvale, CA (US); William B. Turner, San Francisco, CA (US); Paul E. Marks, San Jose, CA (US); Matthew E. Dreisbach, Boulder Creek, CA (US); Joar Wingfors, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/195,438

(22) Filed: Nov. 19, 2018

(65) Prior Publication Data

US 2019/0155581 A1    May 23, 2019

Related U.S. Application Data

(63) Continuation of application No. 15/275,354, filed on Sep. 24, 2016, now Pat. No. 10,162,607.

(60) Provisional application No. 62/339,857, filed on May 21, 2016.

(51) Int. Cl.
*G06F 8/34* (2018.01)
*G06F 3/0482* (2013.01)
*G06F 8/72* (2018.01)
*G06F 11/36* (2006.01)
*G06F 8/38* (2018.01)

(52) U.S. Cl.
CPC ............. *G06F 8/34* (2013.01); *G06F 3/0482* (2013.01); *G06F 8/38* (2013.01); *G06F 8/72* (2013.01); *G06F 11/3668* (2013.01)

(58) Field of Classification Search
CPC ................................ G06F 8/34; G06F 3/0482
USPC ......................................................... 717/109
See application file for complete search history.

(56) References Cited

U.S. PATENT DOCUMENTS

| 5,946,493 | A  | * | 8/1999 | Hanson | G06F 8/447 715/854 |
| 6,237,136 | B1 | * | 5/2001 | Sadahiro | G06F 8/10 717/110 |
| 7,086,046 | B2 | * | 8/2006 | Barsness | G06F 8/443 717/109 |
| 7,730,469 | B1 | * | 6/2010 | Boucher | G06F 8/443 717/151 |

(Continued)

*Primary Examiner* — John Q Chavis
(74) *Attorney, Agent, or Firm* — Womble Bond Dickinson (US) LLP

(57) ABSTRACT

Systems and methods are disclosed for developing an application on a development device. The application is built on a development device, then installed and run on a test device. Installation includes installing an event tap to intercept events generated by a user interacting with the application. In response to a call from the event tap, a test manager daemon snapshots the user interface elements of the application and packages the snapshot and event for transmission to the development device. A development environment on the development device receives the package, then generates and displays optimized source code in response to the received events and snapshots. Generated source code can be optimized to minimize a number identifiers, minimize a length of identifiers, minimize a generated number of lines of code, or optimize the generated source code for readability.

21 Claims, 12 Drawing Sheets

(56) References Cited

U.S. PATENT DOCUMENTS

| | | | |
|---|---|---|---|
| 8,176,475 B2 | 5/2012 | Kosche et al. | |
| 8,402,427 B2 | 3/2013 | Chiang | |
| 8,561,028 B1 | 10/2013 | Zuckerman | |
| 8,782,613 B2 | 7/2014 | Hines | |
| 2003/0023961 A1* | 1/2003 | Barsness | G06F 8/443 717/152 |
| 2011/0296931 A1* | 12/2011 | Warhurst | B01L 3/0227 73/864.01 |
| 2012/0144167 A1* | 6/2012 | Yates, Jr. | G06F 9/30174 712/216 |
| 2014/0365994 A1* | 12/2014 | Vann | G06F 8/30 717/106 |
| 2015/0378578 A1 | 12/2015 | Zhang et al. | |
| 2015/0378871 A1* | 12/2015 | Asthana | G06F 8/443 717/122 |
| 2015/0379557 A1 | 12/2015 | Liu et al. | |

* cited by examiner

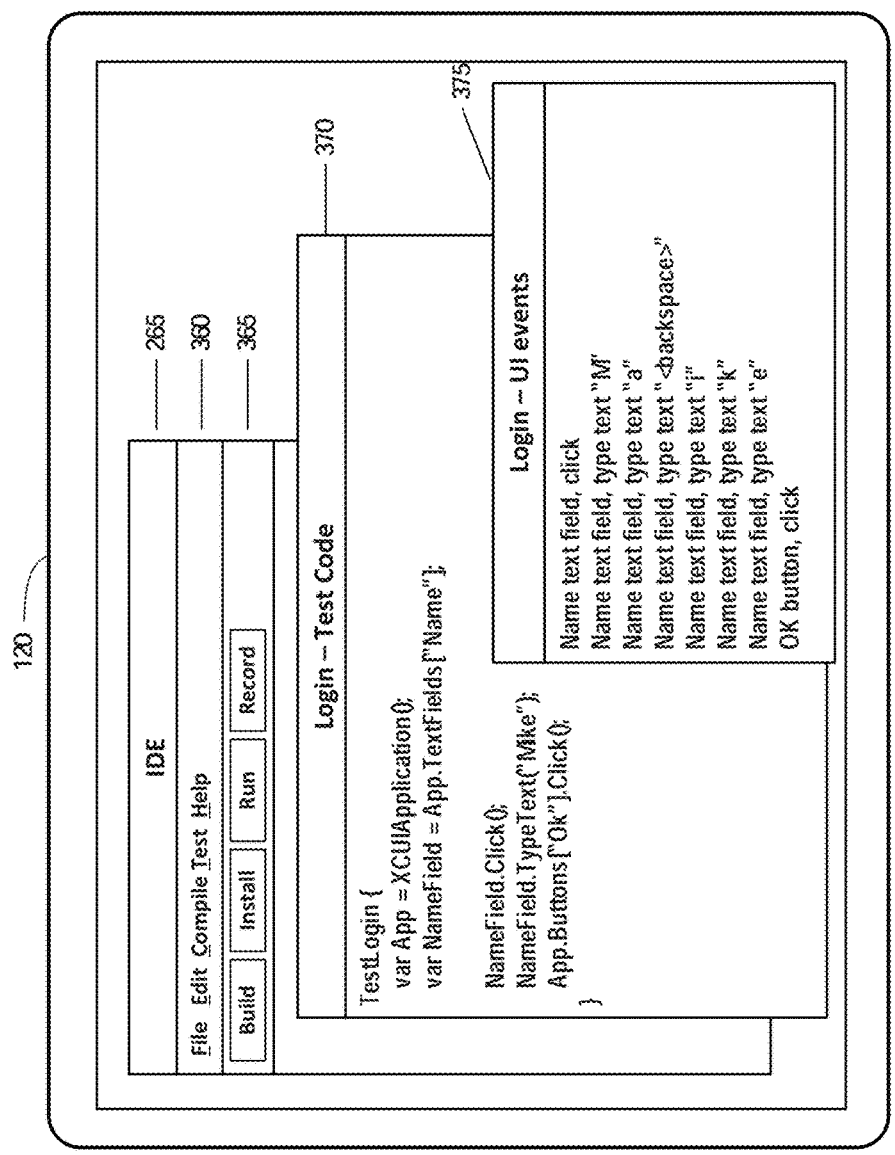
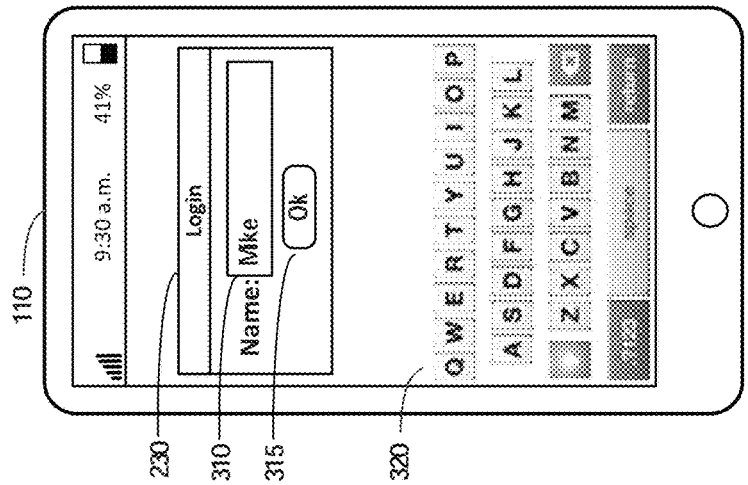
FIG. 3E

SOURCE CODE REWRITING DURING RECORDING TO PROVIDE BOTH DIRECT FEEDBACK AND OPTIMAL CODE

RELATED APPLICATIONS

This application is a continuation of U.S. application Ser. No. 15/275,354 filed on Sep. 24, 2016, which claims priority under 35 U.S.C. § 119(e) of U.S. Patent Application No. 62/339,857, filed May 21, 2016, and entitled, "SOURCE CODE REWRITING DURING RECORDING TO PROVIDE BOTH DIRECT FEEDBACK AND OPTIMAL CODE," which is hereby incorporated by reference to the extent that it is consistent with this disclosure.

TECHNICAL FIELD

This disclosure relates to the field of generation and display of application testing source code on a computing device.

BACKGROUND

Current software development environments often have an editor, a compiler, debugger, and builder for use in software development. This functionality is incorporated into a single software product termed an "integrated development environment" (IDE). Some IDEs also contain a link into an event stream that lets a developer examine a stream of events and see how her software performs in view of the events. An event is typically an atomic event, such as a text control of a user interface receiving a typed character. Each character typed in the text control generates its own event. Thus, typing the name "Mike" in the text control generates the following TypeText events: TypeText("M"), TypeText("i"), TypeText("k"), and TypeText("e"). If the user makes a mistake while typing, a TypeText(<backspace>) will appear in the stream of TypeText events.

A developer will often want to generate test code to test a new program. The test code allows a developer to generate a simulated sequence of user-generated events, without requiring a user to actually generate the events each time the new program is tested. Current software tools generate source code that is based on each received event. The generated source code is difficult to read, lengthy, and not efficiently written.

SUMMARY OF THE DESCRIPTION

Systems and methods are disclosed for generating test source code that tests an application. The source code is generated by capturing and recording events generating by the application while the user interacts with the application. The application is compiled with one or more libraries that include an event tap and a test manager daemon for use on the test device that will run the application during testing. The event tap can intercept the events that are generated by a user interacting with a user interface of the application. The event tap can call the test manager daemon with the event. The test manager daemon can take a snapshot of the user interface elements of the application, package the snapshot with the event, and send the package to an integrated development environment (IDE). The IDE can receive the snapshot and event, and generate optimized source code based on the event and snapshot. The generated source code can be optimized to minimize the number of identifiers in the source code, minimize the length of identifiers in the source code, minimize the number of lines of generated source code, and thereby maximizing the readability of the generated source code.

In an embodiment a non-transitory computer readable medium can store executable instructions, that when executed by a processing system, can perform any of the functionality described above.

In yet another embodiment, a processing system coupled to a memory programmed with executable instructions can, when the instructions are executed by the processing system, perform any of the functionality described above.

Some embodiments described herein can include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

Other features and advantages will be apparent from the accompanying drawings and from the detailed description.

BRIEF DESCRIPTION OF THE DRAWINGS

Embodiments of the invention are illustrated by way of example, and not by way of limitation, in the figures of the accompanying drawings in which like reference numerals refer to similar elements.

FIGS. 3A through 3E illustrate a example displays of an interaction with an application deployed and running on a target device, generating test code on a development device, according to some embodiments.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Figure 1:
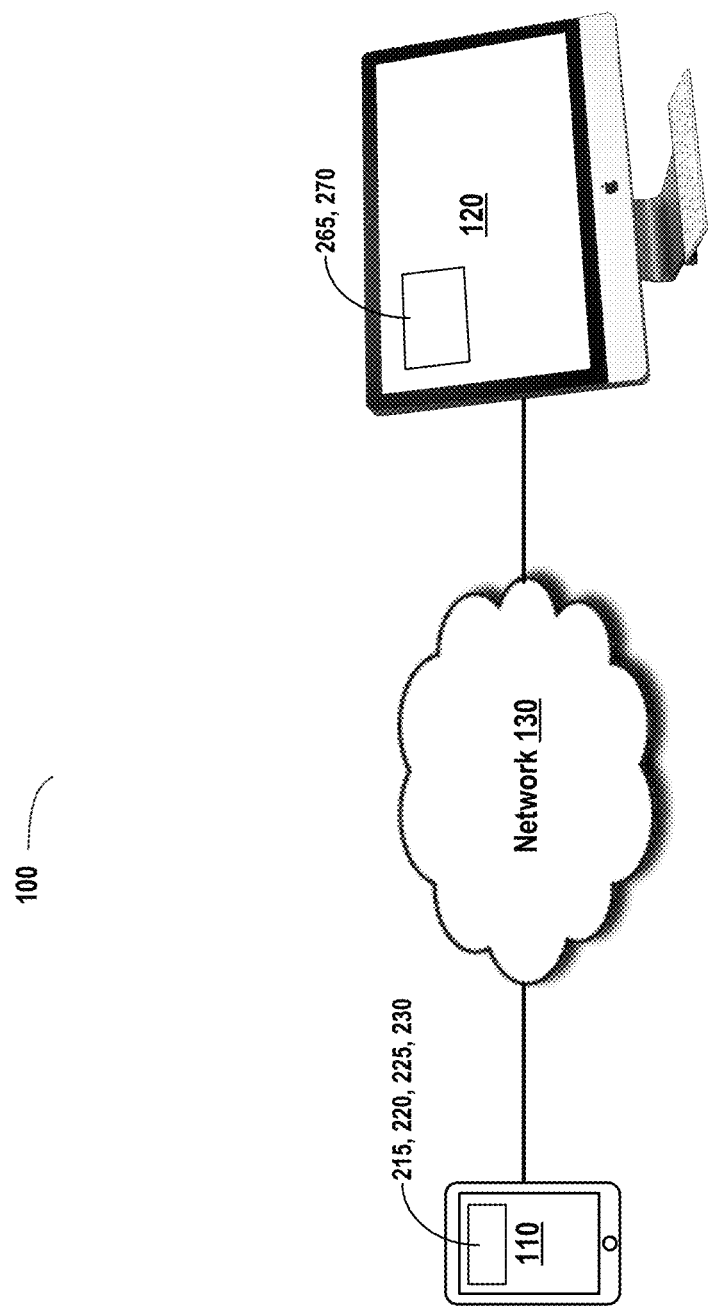
FIG. 1 illustrates, in block form, an overview of an application development environment according to some embodiments.

FIG. 1 illustrates, in block form, an overview of an application development environment 100 according to some embodiments.

A development device 120 can be coupled to a test device 110 via a network 130. An application is developed on development device 120. The application can be built on the development device 120, then transmitted to test device 110 over network 130, along with supporting software components that facilitate installation and testing of the application on the test device 110. Development device 120 can comprise a desktop computer, such as an Apple® iMac®, a tablet computer, such as an Apple® iPad®, or other computing device 110 as described below with reference to FIG. 8.

Test device 110 is a device that will receive, install, and run the application developed on development device 120. Test device 110 can also receive and install supporting software components that facilitate testing of the application. Test device 110 can comprise a desktop computer, such as an Apple® iMac®, a tablet computer, such as an Apple® iPad®, an Apple® iPhone® or other computing device 110 as described below with reference to FIG. 8.

Network 130 can be any type of network, such as Ethernet, Token Ring, Firewire, USB, Fibre Channel, or other network type.

Figure 2:
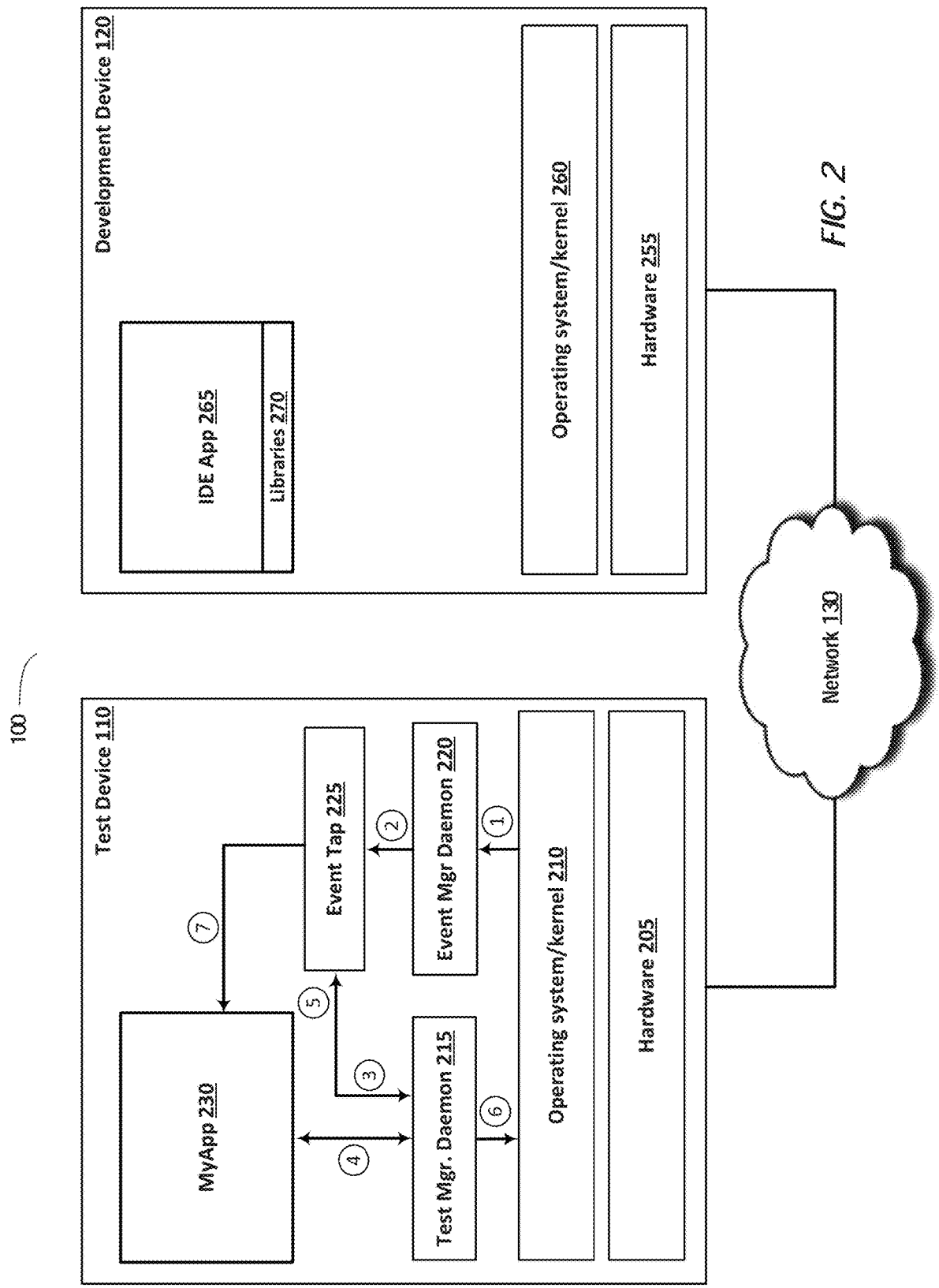
FIG. 2 illustrates, in block form, internal components of a test device and a development device in an application development environment, according to some embodiments.

FIG. 2 illustrates, in block form, internal components of a development environment 100, according to some embodiments. In the figures and examples that follow, a test device 110 and a development device 120 are shown as two distinct devices. However this need not be the case. The test device and development device can be the same device. Such a configuration would not require a network to interconnect the test and development devices because the development and test devices would be the same device.

Internal components of development device 120 can include hardware 255, an operating system and kernel 260, and a development application 265 with access to development libraries 270. Development device 120 hardware 255 can include one or more hardware processors, volatile and non-volatile storage, input/output devices, a display, network communication devices, and other hardware, coupled internally by a bus or other communication structure. Exemplary hardware 255 is described in detail with respect to FIG. 8, below. Development device 120 operating system and kernel 260 can comprise one or more daemons, application programming interfaces (APIs), frameworks, libraries and other functionality that supports the development application IDE 265. APIs are described in detail, below, with reference to FIG. 7.

Test device 110 can include hardware 205, an operating system/kernel 210, a test manager daemon 215, an event manager daemon 220, event tap 225, and an application 230 that is to be tested, e.g. "MyApp." Test device 110 hardware 205 and operating system 210 can comprise substantially the same functionality as development device 120 hardware 255 and operating system/kernel 260, with such differences as may be appropriate for the particular manufacturer, model, and hardware of the test device 110.

A user can interact with MyApp 230, thereby generating one or more hardware events. Operating system/kernel 210 can receive and process hardware events generated by the user interaction with MyApp 230. In operation 1, event manager daemon 220 can receive and process events from operating system/kernel 210. Processing the event can include making one or more calls to operating system/kernel 210, function call, API, framework, or other daemon in the operating system/kernel 210. Events can include, e.g., a click on a user interface element of MyApp 230, typing text into a text field, making a gesture on a touch device, such as swiping a finger, and the like. In operation 2, event tap 225 can receive an event from event manager daemon 220. In operation 3, event tap 225 can call test manager daemon 215 with the event. In operation 4, test manager daemon 215 can take a snapshot of the user interface elements of MyApp 230 ("UI snapshot"). In operation 5, test manager daemon 215 can optionally inform event tap 225 that the UI snapshot has been completed. Event tap 225 can filter events that are destined for MyApp 230. In an embodiment, event tap 225 can determine whether, and when, to pass the event to MyApp 230. In operation 6, test manager daemon 215 can pass the UI snapshot and the event to IDE application 265 on development device 120. In an embodiment, the event can be passed to MyApp for processing instead of, or in addition to, processing of the event by event manager daemon 220. In operation 7, event tap 225 can pass events to MyApp 230.

Development device 120 development application IDE 265 can receive the user interface snapshot and event from test manager daemon 215 over network 130. IDE 265 can process the snapshot and event to generate test source code for future, automated tests of MyApp 230. Generating and optimization of source code is described below with reference to FIGS. 5 and 6.

FIGS. 3A through 3E illustrate example displays of a both test device 110 and development device 120 during an interaction with an application 230 deployed and running on a target test device 110. Displays also show generated test source code and generated events on a development device 120. Interconnecting network 130 is not shown). The specific controls, screens, and hardware configurations shown are exemplary and not limiting.

In FIGS. 3A through 3E, MyApp 230 comprises an application 230 to test a login screen. A user of the test device 110 is to enter his name in the name text field 310 using keypad 320, then click the Ok button 315 to complete a login function of the login application 230. Test device 110 can comprise a touch screen display, such that a "click" event is generated in response to the user touching a location on the touch screen display of test device 110. In an embodiment, the click event can be generating using a pointing device such as mouse, touchpad, or other selection device. Keypad 320 can be a physical keypad or a portion of a touch screen display allocated to the functionality of a keypad.

In FIGS. 3A through 3E, development device 120 can include a development application 265, such as an integrated development environment (IDE). An IDE 265 can comprise an editor, a compiler, a debugger, and deployment functionality that can build a package of software components for installing the application on test device 110 along with any necessary support components. Support components can include an installer, libraries 270, a binary of event tap 225, test manager daemon 215, and other components that may be needed to install and run MyApp 230 (here, login application 230) on test device 110.

IDE 265 can include a menu bar 360 that can contain controls that call the above-described functionality of the IDE 265. A file menu on menu bar 360 can provide controls for creating, opening, and saving one or more source code files, including generated test source code files. An edit menu on menu bar 360 can include controls for performing editing functions such as cut, paste, insert, delete, etc. A compile menu on menu bar 360 can include controls for compiling source code, making or building compiled source code into a package for installation on the test device, parsing source code for errors, debugging source code, etc. A test menu on menu bar 360 can include controls for installing the package on the test device 110, running the installed MyApp 230 on the test device 110, starting/stopping recording of events generated by MyApp 230, etc. A help menu on menu bar 360 can access local help text and online help text related to IDE 265. In an embodiment, help can include help text regarding the test source code that is generated by recording events of MyApp 230. IDE 265 can further include a button bar 365 that can include frequently-used functionality of the IDE 265. Buttons on the button bar 365 can act as a single-click shortcut to functionality that is otherwise accessed by the menus on the menu bar 360. Buttons on button bar 365 can include buttons for frequently-used functionality such as Build, Install, and Run an application. Buttons on button bar 365 can also include a Record button to start/stop recording of events generated by MyApp 230 on test device 110. Buttons on button bar 365 can further include an "Undo" button (not shown), a "Redo" button (not shown) and an "Edit" button (not shown). When source code is optimized and presented to the user, the Undo button (not shown) can present source code generated to the user without optimization, so that the user can visually note the optimizations performed on the source code. The Redo button (not shown) can re-apply the source code optimization and display the optimized source code in place of the unoptimized source code. A user can toggle between optimized and unoptimized source code by pressing the Undo and Redo buttons. The Edit button (not shown) can enter an editing mode that allows the user to edit the generated source code, such as to add comments, or make other changes or additions to the generated source code. In an embodiment, edits to the source code made by the user are not changed by subsequent optimizations of the source code. In an embodiment, only comments are unchanged between source code optimizations. In an embodiment, the relative position of user-added comments within generated source code is preserved between optimizations. IDE 265 can further include a window 370 to display source code generated in response to events from MyApp 230. In an embodiment, IDE 265 can also include a window 375 that displays user interface events generated by MyApp 230 on test device 110. The user interface events window 375 can be updated simultaneously with updated source code in test code window 370.

FIGS. 3A through 3E illustrate a user interacting with MyApp 230, entitled "Login." The login application 230 has a name text field 310 for the user to enter his name. The name text field 310 has a text label "Name:". In embodiment, the text label "Name:" can form a part of the name text field control 310 that receives the user's name. Login application 230 also has an OK button 315 that the user can click when he finishes entering his name.

Figure 3A:
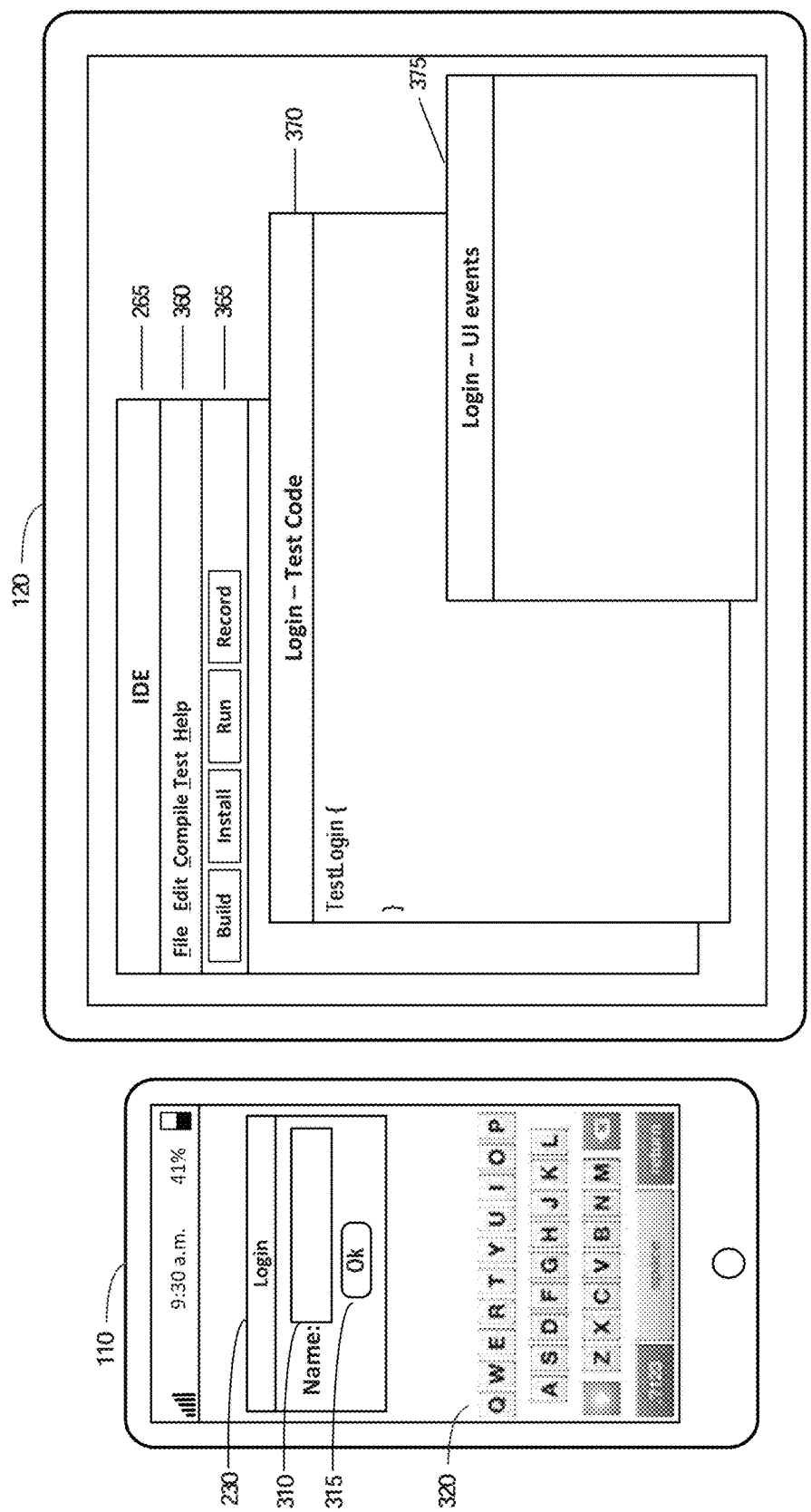

In FIG. 3A, the login application 230 has been compiled, built, installed, and is running on test device 110. The user of the IDE 265 has enabled recording. The user of the IDE 265 has also opened or created a file in window 370 "Login—Test Code" to display test source code generated from events generated by login application 230 on test device 110. In addition the user has opened a window 375 to see a log of events received from login application 230 on test device 110. In FIG. 3A, test code window 370 and event window 375 indicate that no events have been received from Login application 230 and no test source code has been generated yet in test code window 370.

Figure 3B:
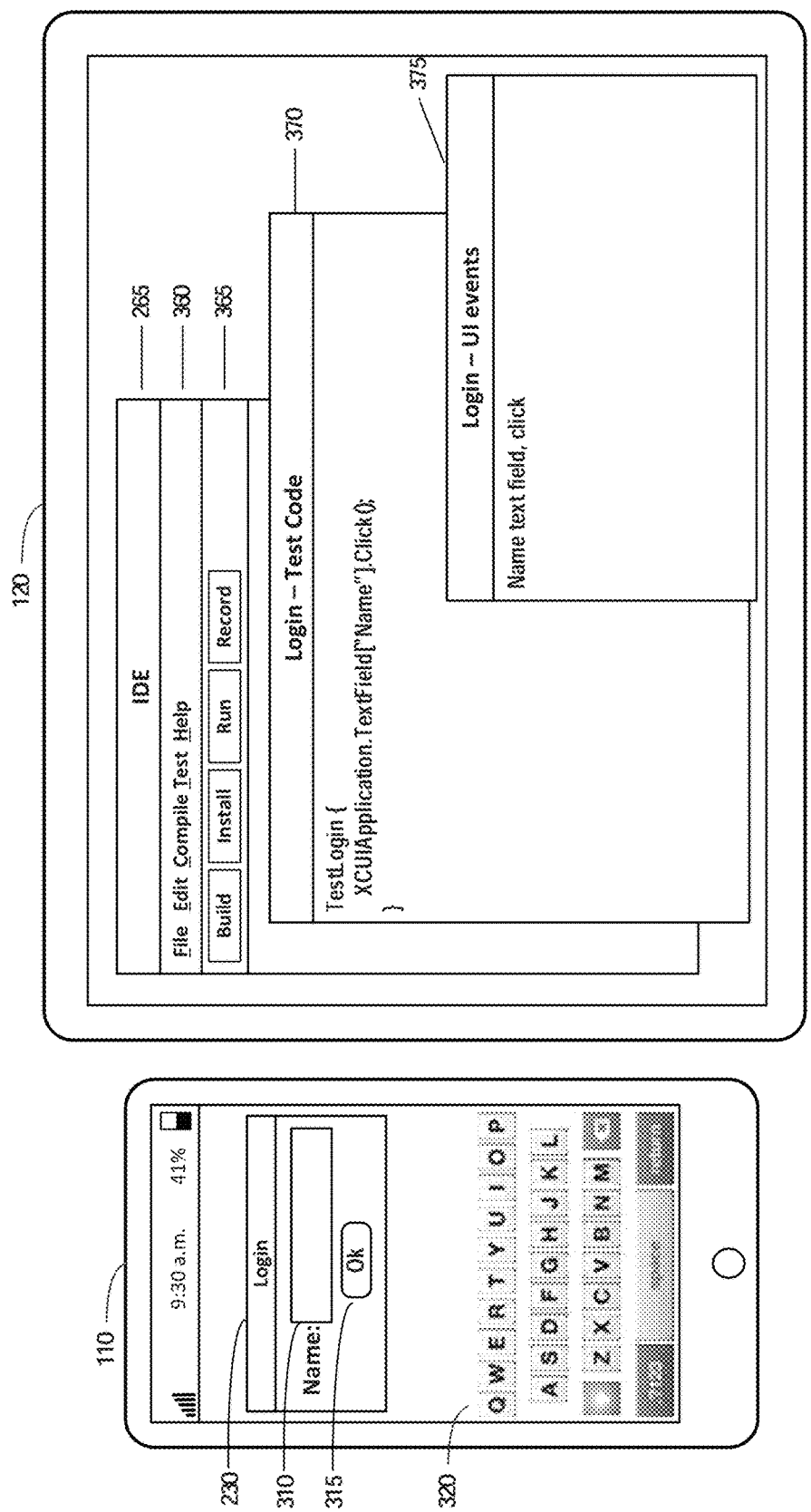

In FIG. 3B, a user of test device 110 has clicked inside the name text field 310. Login application 230 generates a click event for the name text field 310, generating a hardware event that is received by operating system/kernel 210. Event manager daemon 220 can receive and process the event from operating system/kernel 210. Event tap 225 can receive the click event from event manager daemon 220 and pass the click event to test manager daemon 215. Test manager daemon 215 can then take a snapshot of the user interface elements of login application 230 and pass the snapshot and event to IDE application 265 on development device 120. IDE 265 can receive the snapshot and click event and display the click event in the event window 375 for the login application 230. IDE 265 can also use the event and snapshot of the user interface elements of login application 230 to generate and display source code corresponding to the click event for display in test code window 370. Event tap In FIG. 3B, IDE 265 generates source code corresponding to the name text field click event.

Figure 3C:
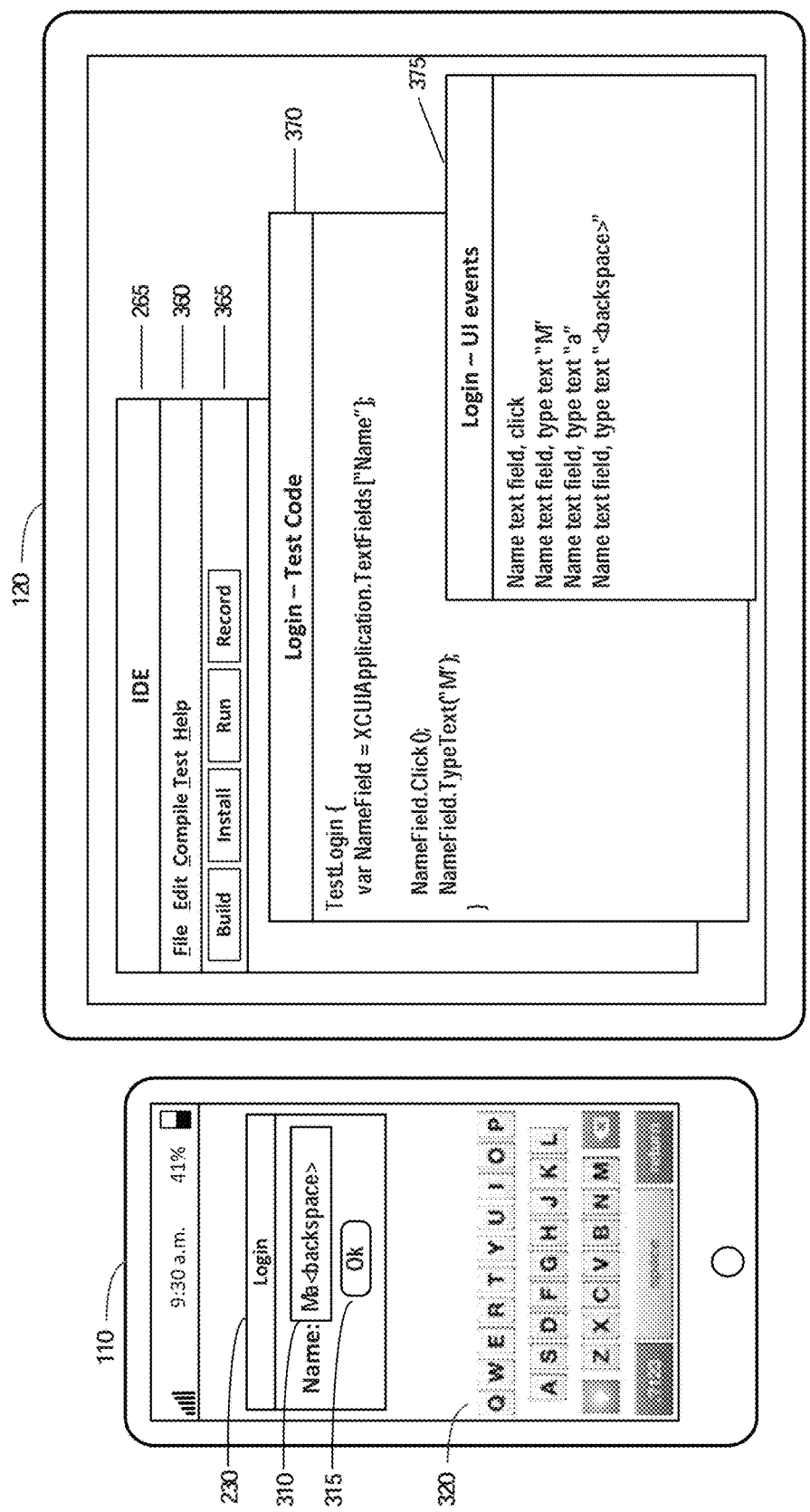

In FIG. 3C, a user has begun typing his name in the name text field 310. First, the user types "M," generating a TypeText("M") event in the events window 375 of the IDE 265 on development device 120, generating hardware events that are received by operating system/kernel 210. The events are then processed by event manager daemon 220. Event tap 225 can receive the TypeText("M") event from event manager daemon 220 and pass the TypeText("M") event to test manager daemon 215. Test manager daemon 215 can take a snapshot of the user interface elements of login application 230 and pass the snapshot and TypeText("M") event to IDE 265 on development device 120. Event tap 225 can pass the TypeText("M") event to login application 230 on test device 110. Similarly, the user can continue typing his name with an "a," which generates a TypeText("a") event. Assuming that the user's name is, "Mike," the user may then type a backspace or delete key to delete the "a" to correct the mistake in typing his name. Event manager daemon 220 can send the TypeText events to event tap 225 that in turn, sends the TypeText events to test manager daemon 215 on test device 110. Test manager daemon 215 can snapshot the user interface of login application 230 and send the snapshots and TypeText events to the IDE 265. IDE 265 can display the TypeText events in the events window 375. Event tap 225 can also send the TypeText events to login application 230. The IDE 265 can synthesize the TypeText events such that the generated source code does not include the erroneously typed "a" or the corrective "backspace." The IDE 265 can optimize the generated source code for the least number of identifiers, the shortest length of identifiers, and/or fewest lines of generated source code. As shown in FIG. 3C, source code window 370, a variable has been generated NameField=XCUIApplication.TextFields["Name"] to simplify the multiple references to the name text field 310. The source code is then simplified by using the NameField variable to reference the Click and TypeText("M") events.

Figure 3D:
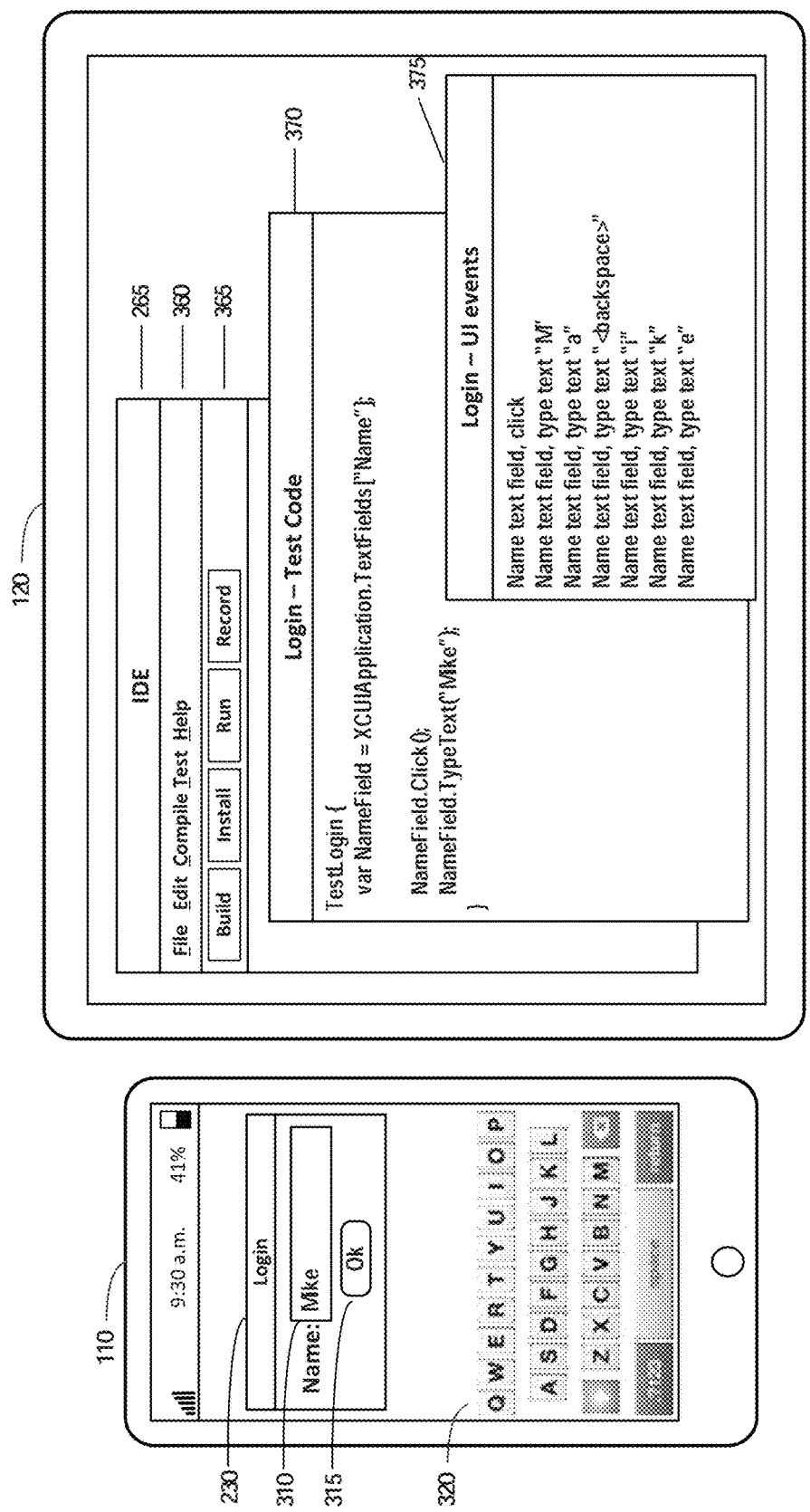

In FIG. 3D, the user has completed typing his name, "Mike," in text name field 310 on test device 110. TypeText events for each letter, "i," "k," and "e," can be generated in the events window 375. The TypeText events can be synthesized, and optimized source code can be generated for the TypeText events in the single source code line, NameField.TypeText("Mike").

In FIG. 3E, the user has clicked the Ok button 315 to complete the login process of the login application 230, thereby generating a hardware event that is received by operating system/kernel 210 and passed to event manager daemon 220 for processing. Event manger daemon 220 can process the event using one or more calls to operation system functions, APIs, frameworks, daemons, or other processes. The Ok button click event is received from event manager daemon 220 by event tap 225 and passed to test manager daemon 215. Test manager daemon 215 can take a snapshot of the user interface of the login application 230 and pass the snapshot and Ok button click event to IDE 265. Event tap 225 can pass the Ok button click event to login application 230.

Figure 4:
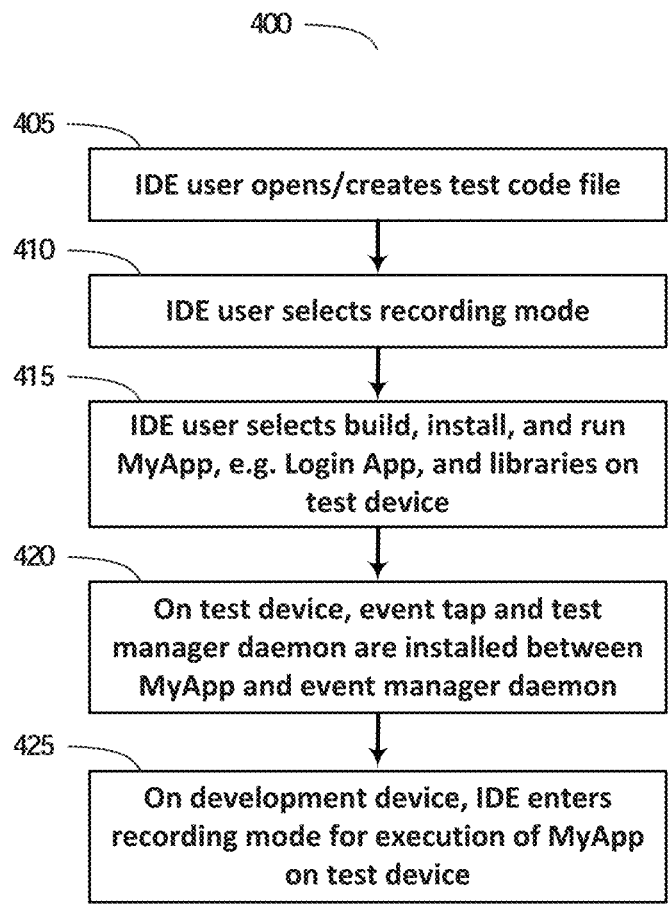
FIG. 4 illustrates a method of building, installing and running an application for test on a test device, according to some embodiments.

FIG. 4 illustrates a method 400 of building, installing and running an application 230 for test on a test device 110, according to some embodiments.

In operation 405, a user of IDE 265 on development device 120 can open or create a file to receive test source code that is generated from events and snapshots of user interface elements of application MyApp 230 running on test device 110 (also referred to as login application 230 in FIGS. 3A-3E).

In operation 410, the user of IDE 265 selects recording mode to record events received from MyApp 230 on test device 110.

In operation 415, the user of the IDE 265 selects build, install, and run of the login application 230 and libraries 270 on test device 110.

In operation 420, on test device 110, event tap 225 and test manager daemon 215 can be installed between login application 230 and event manager daemon 220.

In operation 425, recording mode can be selected on IDE 265 on development device 120. Login application 230 on test device 110 enters recording mode. In recording mode, a hardware event is received by operation system/kernel 210 and passed to event manager 220 for processing. Event manager daemon 220 may call one or more APIs, system calls, daemons, processes, frameworks, or functions that process the event, then pass the event and process results to login application 230. Event manager daemon then passes the event to event tap 225. Event tap 225 can call test manager daemon 215 with the event. In response to the call from event tap 225, or otherwise receiving the event from event tap 225, test manager daemon 215 can take a snapshot of the user interface elements of login application 230. Test manager daemon 215 then packages the snapshot and event and passes the package to IDE 265 on development device 120. Event tap 225 then releases the event to login application 230.

Figure 5:
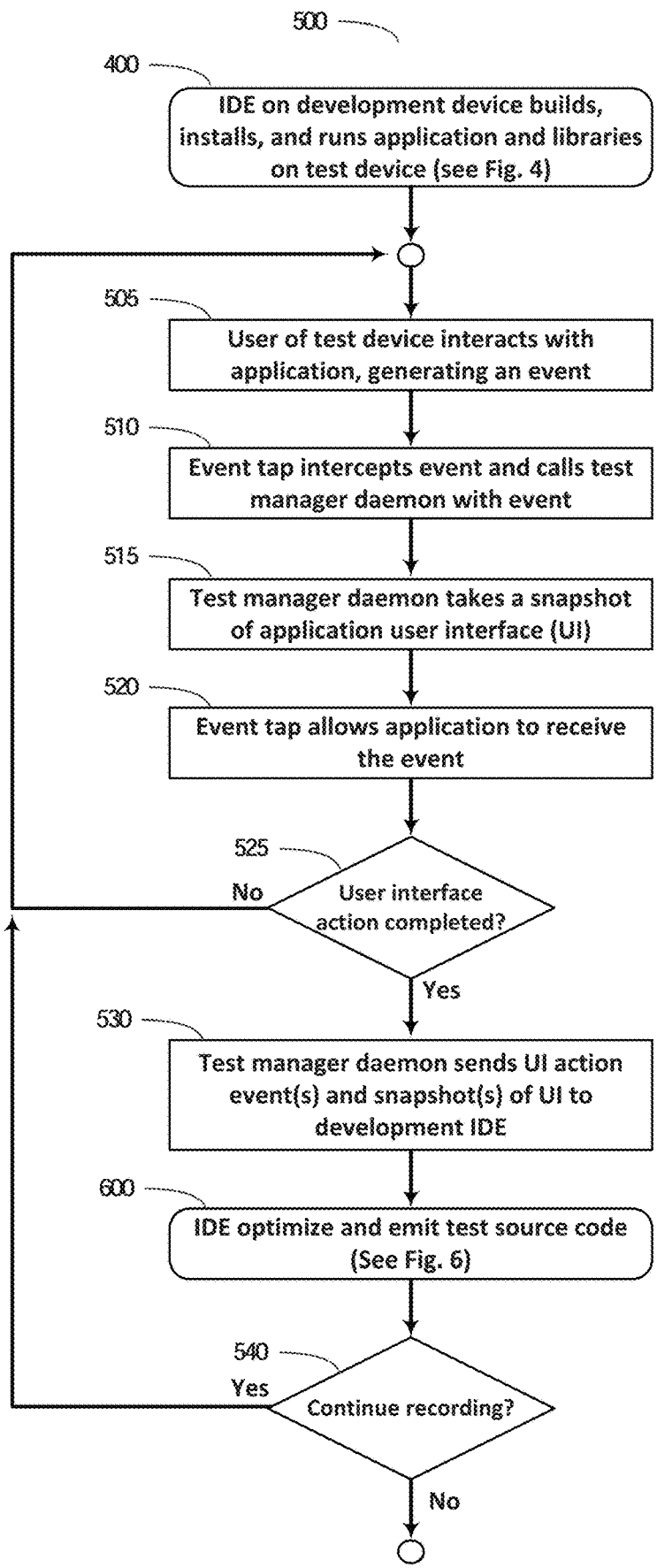
FIG. 5 illustrates a method of automatically generating optimized test code based on events received from the application on the test device, according to some embodiments.

FIG. 5 illustrates a method 500 of automatically generating optimized test source code based on user interface snapshots and events received from the application 230 on the test device 110, according to some embodiments.

In operation 400, the IDE on development device 120 builds, installs and runs application 230 on test device 110. Operation 400 is described in detail with reference to FIG. 4, above.

In operation 505, a user of test device 110 interacts with the application 230 thereby generating a hardware event that is received by operating system/kernel 210 and passed to event manager daemon 220 for processing In operation 510, event tap 225 intercepts the event from the event manager daemon 220 and calls test manager daemon 215 with the event.

In operation 515, test manager daemon 215 takes a snapshot of user interface elements of the application 230.

In operation 520, event tap 225 allows the application 230 to receive the event my passing the event to event manager daemon 220.

In operation 525, it can be determined whether the user interface action is completed. For example, a user interface action may require multiple keystrokes, gestures, touch screen actions, or combination of these before the action is deemed completed. If in operation 525 it is determined that the user interface action is not complete, then method 500 resumes at operation 505. Otherwise method 500 continues at operation 530.

In operation 530, test manager daemon 215 packages the snapshot of user interface elements taken in operation 515 with the event generated in operation 505 and passes the package to IDE 265 on development device 120.

In operation 600, IDE 265 optimizes and emits test source code for display in test code window 370 of IDE 265. Operation 600 is described in more detail, below, with reference to FIG. 6.

In operation 540, it is determined whether recording of events should continue. If so, then method 500 resumes at operation 505. Otherwise method 500 ends.

Figure 6:
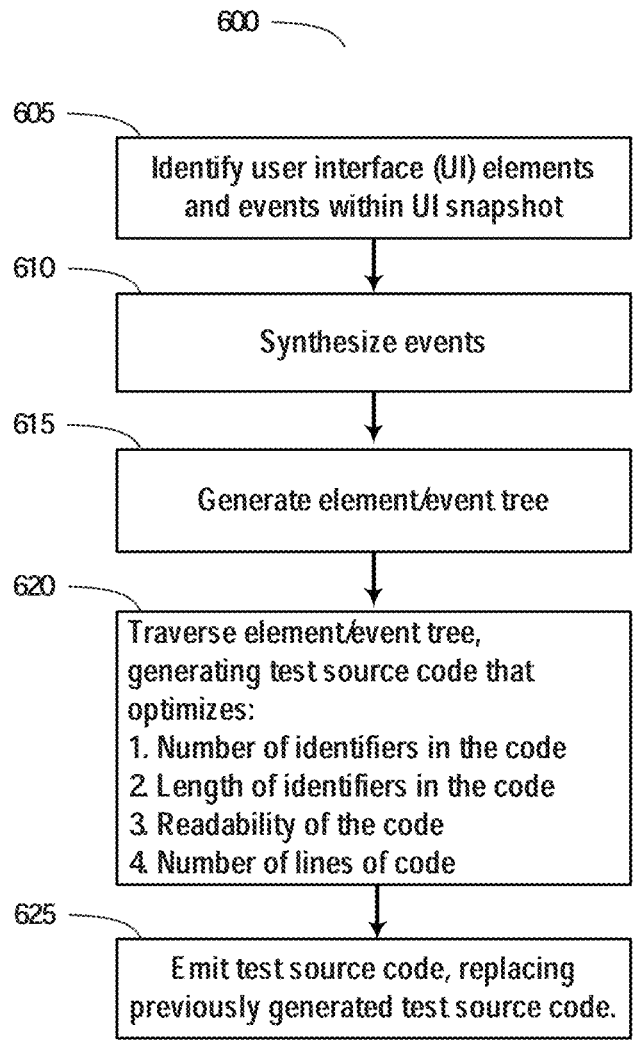
FIG. 6 illustrates a method of optimizing test code generated in a development environment, according to some embodiments.

FIG. 6 illustrates a method 600 of optimizing test code generated in a development environment, according to some embodiments.

In operation 605, user interface elements are identified with the user interface snapshot received from test manager daemon 215 on test device 110.

In operation 610, events received from test manager daemon 215 can be synthesized into an optimized series of events. For example, as described with reference to FIGS. 3C and 3D, above, a series of TypeText events for the user name "Mike," containing a correction, can be synthesized into a single TypeText event: TypeText("Mike").

In operation 615, an element/event tree can be generated that represents the elements of the user interface in the received snapshot.

In operation 620, the element/event tree can be traversed, generating source code during the traversal. The source code can be optimized to minimize a number of identifiers used in the generated source code, minimize a length of identifiers used in the generated source code, maximize readability of the generated source code, or minimize the number of lines of generated source code. In an embodiment, one or more of the above optimizations results in source code that can execute more efficiently by reducing a number of calls to an API, framework, operating system/kernel 210 function, interpreter, library, or other functionality. For example, optimizing a sequence of TypeText events into a single TypeText call, e.g. TypeText("Mike"), can result in fewer function calls.

In operation 625, optimized source code is emitted, replacing the previously generated source code.

Figure 7:
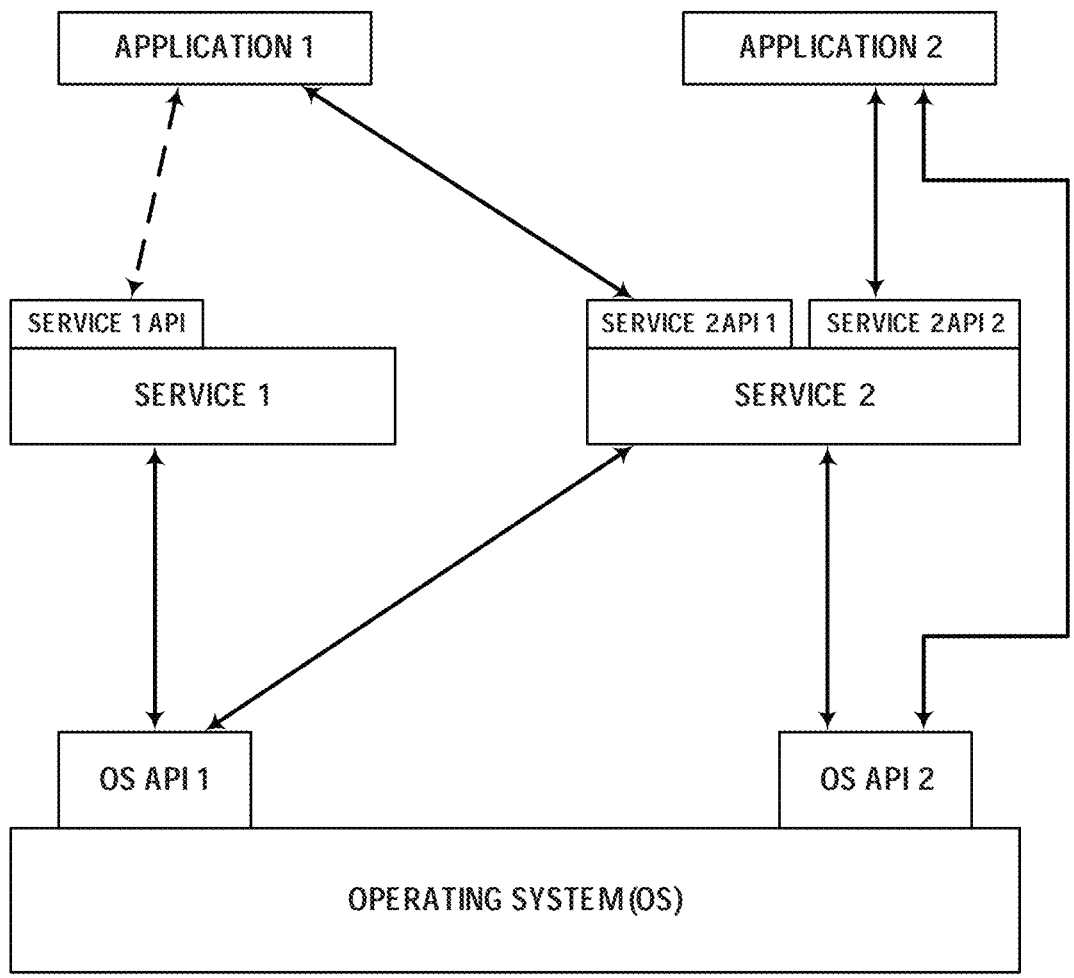
FIG. 7 illustrates an exemplary embodiment of a software stack usable in some embodiments of the invention.

In FIG. 7 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Figure 8:
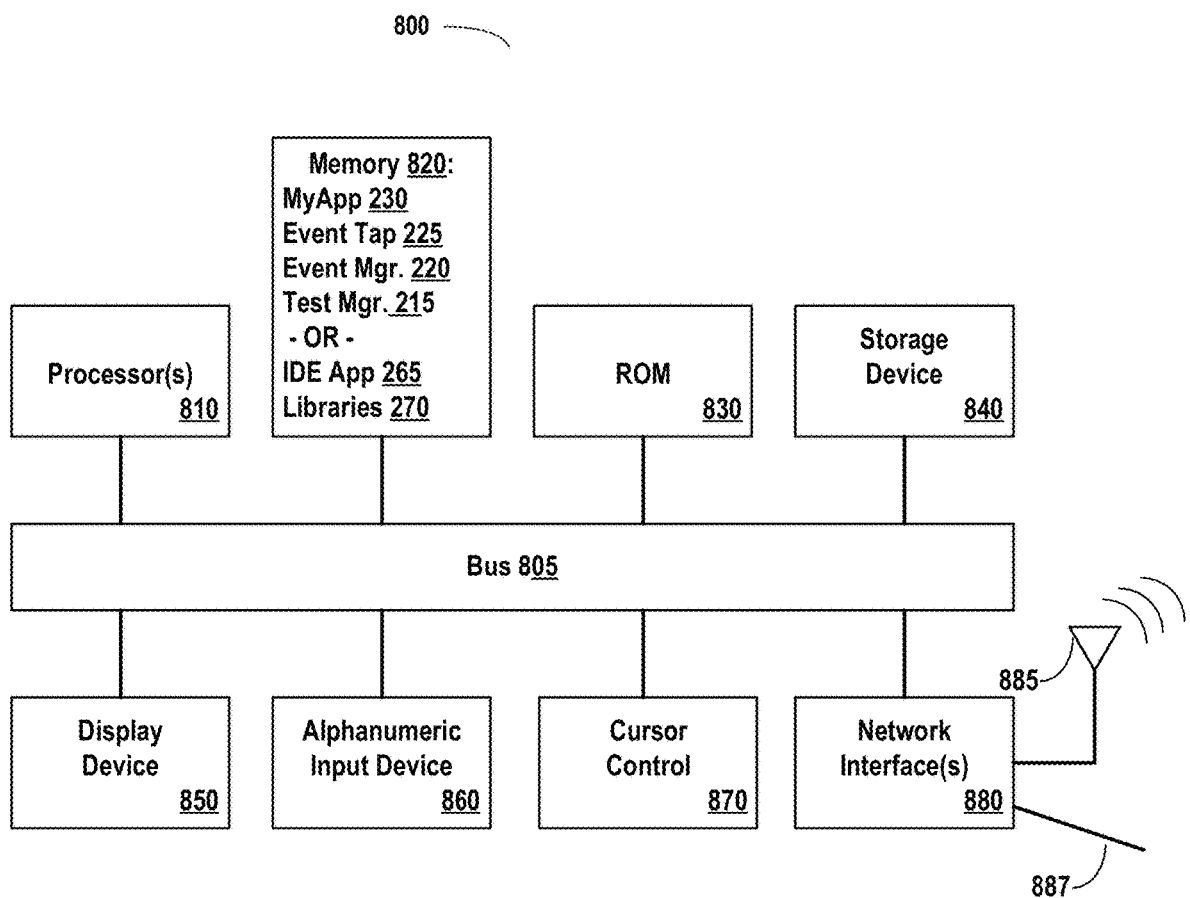
FIG. 8 is a block diagram of one embodiment of a computing system.

FIG. 8 is a block diagram of one embodiment of a computing system 800. The computing system illustrated in FIG. 8 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 8 may be used to provide the computing device and/or the server device.

Computing system 800 includes bus 805 or other communication device to communicate information, and processor 810 coupled to bus 805 that may process information.

While computing system 800 is illustrated with a single processor, computing system 800 may include multiple processors and/or co-processors 810. Computing system 800 further may include random access memory (RAM) or other dynamic storage device 820 (referred to as main memory), coupled to bus 805 and may store information and instructions that may be executed by processor(s) 810. Main memory 820 may also be used to store temporary variables or other intermediate information during execution of instructions by processor 810.

Computing system 800 may also include read only memory (ROM) and/or other static storage device 840 coupled to bus 805 that may store static information and instructions for processor(s) 810. Data storage device 840 may be coupled to bus 805 to store information and instructions. Data storage device 840 such as flash memory or a magnetic disk or optical disc and corresponding drive may be coupled to computing system 800.

Computing system 800 may also be coupled via bus 805 to display device 850, such as a cathode ray tube (CRT) or liquid crystal display (LCD), to display information to a user. Computing system 800 can also include an alphanumeric input device 860, including alphanumeric and other keys, which may be coupled to bus 805 to communicate information and command selections to processor(s) 810. Another type of user input device is cursor control 870, such as a touchpad, a mouse, a trackball, or cursor direction keys to communicate direction information and command selections to processor(s) 810 and to control cursor movement on display 850. Computing system 800 may also receive user input from a remote device that is communicatively coupled to computing system 800 via one or more network interfaces 880.

Computing system 800 further may include one or more network interface(s) 880 to provide access to a network, such as a local area network. Network interface(s) 880 may include, for example, a wireless network interface having antenna 885, which may represent one or more antenna(e). Computing system 800 can include multiple wireless network interfaces such as a combination of WiFi, Bluetooth® and cellular telephony interfaces. Network interface(s) 880 may also include, for example, a wired network interface to communicate with remote devices via network cable 887, which may be, for example, an Ethernet cable, a coaxial cable, a fiber optic cable, a serial cable, or a parallel cable.

In one embodiment, network interface(s) 880 may provide access to a local area network, for example, by conforming to IEEE 802.11 b and/or IEEE 802.11 g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 880 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method, comprising:
receiving, by an application development system, a first event generated by user interaction with an executing application and a snapshot of a first state of user interface elements of the executing application, the first state including the first event;
automatically generating first source code that corresponds to the first event;
receiving, by the application development system, a second event generated by user interaction with the executing application and a snapshot of a second state of user interface elements of the executing application, the second state including the second event;
synthesizing the first and second events and automatically generating second source code that is optimized based at least in part on the synthesis of both the first and second events and the snapshots of the first and second states of the user interface elements of the executing application; and
automatically replacing the first source code with the optimized second source code.

2. The method of claim 1, wherein optimizing source code based on synthesis of the first and second events includes at least one of:
minimizing a number of identifiers used in the source code;
minimizing a length of at least one identifier used in the source code;
minimizing a number of calls to an API, framework, or operating system function; or
minimizing a number of lines of source code generated.

3. The method of claim 1, wherein optimizing source code based on synthesis of the first and second events includes consolidating events, wherein consolidating events comprises excluding one or more of the first or second events.

4. The method of claim 3, wherein excluding one or more of the first or second events comprises excluding a TypeText event that comprises a backspace or delete key, and excluding the TypeText event that immediately preceded the TypeText event comprising the backspace or delete key.

5. The method of claim 3, wherein consolidating events comprises combining a sequence of one or more TypeText events into a single TypeText event comprising the text of each of the one or more TypeText events.

6. The method of claim 1, wherein the automatically replacing of the first source code with the optimized second source code includes displaying the optimized second source code in place of the first source code.

7. A non-transitory computer readable medium programmed with instructions that, when executed by a processing system, perform operations, comprising:
receiving, by an application development system, a first event generated by user interaction with an executing application a snapshot of a first state of user interface elements of the executing application, the snapshot including the first event;

automatically generating first source code that corresponds to the first event;

receiving, by the application development system, a second event generated by user interaction with the executing application and a snapshot of a second state of the user interface elements of the executing application, the second state including the second event;

synthesizing the first and second events and automatically generating second source code that is optimized based at least in part on the synthesis of both the first and second events and the snapshots of the first and second states of the user interface elements of the executing application;

automatically replacing the first source code with the optimized second source code.

8. The medium of claim 7, wherein optimizing source code based on synthesis of the first and second events includes at least one of:

minimizing a number of identifiers used in the source code;

minimizing a length of at least one identifier used in the source code;

minimizing a number of calls to an API, framework, or operating system function; or minimizing a number of lines of source code generated.

9. The medium of claim 8, wherein optimizing source code based on synthesis of the first and second events includes consolidating events, wherein consolidating events comprises excluding one or more of the first or second events.

10. The medium of claim 9, wherein excluding one or more of the first or second events comprises excluding a TypeText event that comprises a backspace or delete key, and excluding the TypeText event that immediately preceded the TypeText event comprising the backspace or delete key.

11. The medium of claim 9, wherein consolidating events comprises combining a sequence of one or more TypeText events into a single TypeText event comprising the text of each of the one or more TypeText events.

12. A system comprising:

a processing system coupled to a memory programmed with executable instructions that, when executed by the processing system perform operations, comprising:

receiving, by an application development system, a first event generated by user interaction with an executing application and a snapshot of a first state of user interface elements of the executing application, the first state including the first event;

automatically generating first source code that corresponds to the first event based on the first event and the snapshot of the first state of the user interface;

receiving, by the application development system, a second event generated by user interaction with the executing application and a snapshot of a second state of the user interface elements of the executing application, the second state including the second event;

synthesizing the first and second events and automatically generating second source code that is optimized based at least in part on the synthesis of both the first and second events and the snapshots of the first and second states of the user interface elements of the executing application;

automatically replacing of the first source code with the optimized second source code.

13. The system of claim 12, wherein optimizing source code based on synthesis of the first and second events includes at least one of:

minimizing a number of identifiers used in the source code;

minimizing a length of at least one identifier used in the source code;

minimizing a number of calls to an API, framework, or operating system function; or minimizing a number of lines of source code generated.

14. The system of claim 12, wherein optimizing source code based on synthesis of the first and second events includes consolidating events, wherein consolidating events comprises excluding one or more of the first or second events.

15. The system of claim 14, wherein excluding one or more of the first or second events comprises excluding a TypeText event that comprises a backspace or delete key, and excluding the TypeText event that immediately preceded the TypeText event comprising the backspace or delete key.

16. The system of claim 14, wherein consolidating events further comprises combining a sequence of one or more TypeText events into a single TypeText event comprising the text of each of the one or more TypeText events.

17. A computer-implemented method, comprising:

receiving one or more lines of first source code in a user interface;

receiving an event generated by user interaction with the user interface;

automatically generating second source code that is optimized based on the one or more lines of first source code received in the window of the user interface and the event; and automatically causing the optimized second source code to be displayed in the user interface in place of the first source code, wherein the user interface comprises at least one text input field that receives the one or more lines of first source code and a control that generates the event, in response to a user input, causing generating and display of the optimized second source code.

18. The method of claim 17, wherein generating the optimized second source comprises at least one of:

minimizing a number of identifiers used in the second source code;

minimizing a length of at least one identifier used in the second source code;

minimizing a number of calls to an API, framework, or operating system function; or minimizing a number of lines of second source code generated.

19. The method of claim 17, wherein generating the optimized second source code comprises:

consolidating two or more TypeText events into a single TypeText event; and replacing the first source generated from the two or more TypeText events with the second source code generating from the single TypeText event.

20. The method of claim 17, wherein generating the optimized second source code comprises:

generating a short-hand reference to an object having an object identifier, for which there are a plurality of instances of the object identifier in the first source code; and replacing the plurality of instances of the object identifier of the first source code with the short-hand reference to the object.

21. The method of claim 20, further comprising:

receiving a new event related to the object having the object identifier; and generating one or more new lines of source code using the short-hand reference to the object.

\* \* \* \* \*